United States Patent [19]

Zimmerman

[11] 4,239,855
[45] Dec. 16, 1980

[54] POLYURETHANE CATALYSTS AND METHOD OF USE

[75] Inventor: Robert L. Zimmerman, Austin, Tex.

[73] Assignee: Texaco Development Corp., White Plains, N.Y.

[21] Appl. No.: 927,244

[22] Filed: Jul. 21, 1978

[51] Int. Cl.³ ............... C08G 18/20; C08G 18/18; C07C 93/16; C07C 93/26
[52] U.S. Cl. ............... 521/115; 528/53; 544/171; 560/110; 560/222; 560/252
[58] Field of Search ............... 521/129, 115; 528/53; 560/110, 252, 222

[56] References Cited

U.S. PATENT DOCUMENTS 4,049,931  9/1977  Sandner et al. ............... 521/129

FOREIGN PATENT DOCUMENTS 214176  9/1956  Australia ............... 528/53
432803  8/1924  Fed. Rep. of Germany ............... 560/252

*Primary Examiner*—H. S. Cockeram
*Attorney, Agent, or Firm*—Carl G. Ries; Thomas H. Whaley; James L. Bailey

[57] ABSTRACT

Covers compounds of the formula

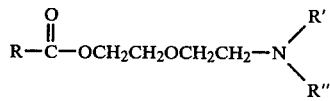

where R is lower alkyl, lower alkenyl or phenyl and R' and R" are either lower alkyl or form a morpholine ring when taken with the adjacent nitrogen atom. Also covers a method of producing a polyurethane foam and elastomer by utilizing said above compounds as catalysts in reacting an organic polyisocyanate with an organic polyester polyol or polyether polyol in the presence of said catalyst.

6 Claims, No Drawings

POLYURETHANE CATALYSTS AND METHOD OF USE

BACKGROUND OF THE INVENTION

1. Field of the Invention

This invention pertains to the field of urethane catalysts. More particularly, this invention relates to the use of certain amines as urethane catalysts.

2. Description of the Prior Art

The use of a catalyst in preparing polyurethanes by the reaction of a polyisocyanate, a polyol and perhaps other ingredients is known. The catalyst is employed to promote at least two, and sometimes three major reactions that must proceed simultaneously and competitively at balanced rates during the process in order to provide polyurethanes with the desired physical characteristics. One reaction is a chain-extending isocyanate-hydroxyl reaction by which a hydroxyl-containing molecule is reacted with an isocyanate-containing molecule to form a urethane. This increases the viscosity of the mixture and provides a polyurethane containing secondary nitrogen atom in the urethane groups. A second reaction is a cross-linking isocyanate urethane reaction by which an isocyanate-containing molecular reacts with a urethane group containing a secondary nitrogen atom. The third reaction which may be involved is an isocyanate-water reaction by which an isocyanate-terminated molecule is extended and by which carbon dioxide is generated to blow or assist in the blowing of the foam. This third reaction is not essential if an extraneous blowing agent, such as a halogenated, normally liquid hydrocarbon, carbon dioxide, etc., is employed, but is essential if all or even a part of the gas for foam generation is to be generated by this in-situ reaction (e.g. in the preparation of "one-shot" flexible polyurethane foams).

The reactions must proceed simultaneously at optimum balanced rates relative to each other in order to obtain a good foam structure. If carbon dioxide evolution is too rapid in comparison with chain extension, the foam will collapse. If the chain extension is too rapid in comparison with carbon dioxide evolution, foam rise will be restricted, resulting in a high density foam with a high percentage of poorly defined cells. The foam will not be stable in the absence of adequate crosslinking.

It has long been known that tertiary amines are effective for catalyzing the second crosslinking reaction. However, many amines of this class have a strong amine odor which is carried over to the polyurethane foam.

In still other cases, some tertiary amines impart a color to the product foam known as "pinking".

In addition to problems of odor and pinking, other tertiary amines suffer still further deficiencies. For example, in some instances the compounds are relatively high in volatility leading to obvious safety problems. In addition, some catalysts of this type do not provide sufficient delay in foaming, which delay is particularly desirable in molding applications to allow sufficient time to situate the prefoam mix in the mold. Yet other catalysts, while meeting specifications in this area do not yield foams with a desirable tack-free time. Lastly, some catalysts of this type are solids causing handling problems.

It would therefore be a substantial advance in the art if a new class of amine catalysts were discovered which overcome some of the just enumerated disadvantages of the prior art.

SUMMARY OF THE INVENTION

A new class of compounds has been discovered which have been found useful as polyurethane catalysts. These compounds have the following structural formula

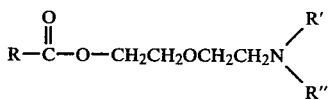

where R is a radical selected from the group consisting of lower alkyl, lower alkenyl and phenyl and R' and R" are independently lower alkyl or when taken together with the adjacent nitrogen atom form a morpholino radical. When R' and R" are lower alkyl they preferably contain 1–4 carbon atoms.

DESCRIPTION OF THE PREFERRED EMBODIMENTS

The compounds here may be prepared by resort to a wide variety of synthetic techniques. However, preferably these compositions are prepared by first making N,N-dialkylaminoethanol or N-aminoethoxy morpholine, well-known classes of compounds. These compounds are in turn reacted with

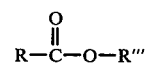

where R is as indicated above and R''' is lower alkyl. A transesterification type of reaction then takes place to form the compounds of the invention.

The compounds here possess a number of useful characteristics making them exceptionally atractive as polyurethane catalysts. For example, the just defined compounds have rapid catalytic activity in the polyurethane foam area. In addition, the compounds here are also relatively non-volatile and possess little, if any odor. Also, and most importantly the compounds do not cause pinking so often observed when other testing amine catalysts are employed, particularly when polyester polyols are used to make urethanes. The catalysts of the invention are particularly desirable in foaming urethanes in that they provide a sufficient delay in the foaming operation to aid in processing. Yet the catalysts also give good foams with desirable tack-free times. This delay time is particularly desirable in molding applications to allow sufficient time to situate the prefoam mix in the mold. Lastly, the compounds are easily prepared as typically described above, and are relatively inexpensive.

To prepare polyurethanes using the catalysts here, any aromatic polyisocyanate may be used. Typical aromatic polyisocyanates include m-phenylene diisocyanate, p-phenylene dioscyanate, polymethylene polyphenylisocyanate, 2,4-toluene diisocyanate, 2,6-tolylene diisocyanate, dianisidine diisocyanate, bitolylene diisocyanate, naphthalene-1,4-diisocyanate, diphenylene-4,4'-diisocyanate, aliphatic-aromatic diisocyanates, such as xylylene-1,4-diisocyanate, xylylene-1,4-diisocyanate, xylylene-1,3-diisocyanate, bis(4-isocyanatophenyl)methane, bis(3-methyl-4-isocyanatophenyl)methane, and 4,4'-diphenylpropane diisocyanate.

Greatly preferred aromatic polyisocyanates used in the practice of the invention are 2,4- and 2,6-toluene diisocyanates and methylene-bridged polyphenyl polyisocyanate mixtures which have a functionally of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162; and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known commercially available materials and can be prepared by the process described in U.S. Pat. No. 3,362,979, issued Jan. 9, 1968 to Floyd E. Bentley.

The hydroxyl-containing polyol component which reacts with the isocyanate may suitably be a polyester polyol or a polyether polyol having a hydroxyl number ranging from about 700 to about 25, or lower. When it is desired to provide a flexible foam, the hydroxyl number is preferably in the range from about 25 to 60. For rigid foams, the hydroxyl number is preferably in the range from 350 to 700. Semi-rigid foams of a desired flexibility are provided when the hydroxyl number is intermediate to the ranges just given.

When the polyol is a polyester, it is preferable to use as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is non-ethyleneic and non-reactive. Thus, aromatic acids may be employed for the acid component. Aliphatic acids, such as succinic acid, adipic acid, sebacic acid, azelaic acid, etc., may also be employed. The alcohol component for the polyester should preferably contain a plurality of hydroxyl groups and is preferably an aliphatic alcohol, such as ethylene glycol, glycerol, pentarthyritol, trimethylolethane, trimethylolpropane, mannitol, sorbitol, or methyl glucoside. Mixtures of two or more of the above identified alcohols may be employed also if desired. When a flexible urethane foam is desired, the polyol should preferably have an average functionality of from about 2 to about 4 and a molecular weight of from about 2,000 to about 4,000. For rigid foams, the functionality of the polyol component is preferably from about 4 to about 7.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide.

For rigid polyether polyurethane foams, the polyol should have a functionality of from about 4 to about 7 and a molecular weight of from about 300 to about 1,200. Polyols for rigid polyether polyurethane foams may be made in various ways including the addition of an alkylene oxide as above to a polyhydric alcohol with a functionality of from 4 to 7. These polyols may also be, for example, Mannich condensation products of a phenol, an alkanolamine, and formaldehyde, which Mannich condensation product is then reacted with an alkylene oxide (See U.S. Pat. No. 3,297,597).

The amount of hydroxyl-containing polyol compound to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 1.05 to about 1.5 mol equivalents of isocyanate groups per mol equivalent of hydroxyl groups. However, for certain shock absorbing foams we have found that by using the catalysts of our invention the mol equivalents of isocyanate to hydroxyl groups can be as low as 0.4.

When water is used, the amount of water, based on the hydroxyl compound, is suitably within the range of about 0.05 mol per mol equivalent of hydroxy compound.

It is within the scope of the present invention to utilize an extraneously added inert blowing agent such as a gas or gas-producing material. For example, halogenated low-boiling hydrocabons, such as trichloromonofluoromethane and methylene chloride, carbon dioxide, nitrogen, etc., may be used. The inert blowing agent reduces the amount of excess isocyanate and water that is required in preparing flexible urethane foam. For a rigid foam, it is preferable to avoid the use of water and to use exclusively the extraneous blowing agent. Selection of the proper blowing agent is well within the knowledge of those skilled in the art. See for example U.S. Pat. No. 3,072,082.

The catalysts discovered here which are useful in the preparation of rigid or flexible polyester or polyether polyurethane foams, based on the combined weight of the hydroxyl-containing compound and polyisocyanate are employed in an amount of from about 0.05 to about 4.0 weight percent. More often than the amount of catalyst used in 0.1–1.0 weight percent. Most preferably, the catalysts here are employed to mold flexible polyester or polyether polyurethane foams.

The catalysts of this invention may be used either alone or in a mixture with one or more other catalysts such as other tertiary amines or with an organic tin compound or other polyurethane catalysts. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibultyltin dilarurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such other tertiary amines include trialkylamines (e.g. trimethylamine, triethylamine), heterocyclic amines, such as N-alkylmorpholines (e.g., N-methylmorphorline, N-ethylmorphonline, etc.), 1,4-dimethylpiperazine, triethylenediamine, ect., aliphatic polyamines, such as N,N,N'N'-tetramethyl-1,3-butanediamine.

Conventional formulation ingredients are also employed, such as, for example, foam stabilizers also known as silicone oils or emulsifiers. The foam stabilizer may be an organic silane or siloxane. For example, compounds may be used having the formula: $RSi[O-(R_2SiO)_n-(oxyalkylene)_mR]_3$ wherein R is an alkyl group containing from 1 to 4 carbon atoms; n is an integer of from 4 to 8; m is an integer of 20 to 40; and the oxylakylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g., 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

When it is desired to prepare rigid foams, the "one-shot" method or the so-called "quasi-prepolymer method", is employed, wherein the hydroxyl-containing component preferably contains from about 4 to 7 reactive hydroxyl groups, on the average, per molecule.

In accordance with the "quasi-prepolymer method", a portion of the hydroxyl-containing component is reacted in the absence of a catayslt with the polyisocyanate component in proportions so as to provide from about 20 percent to about 40 percent of free isocyanato groups in the reaction product, based on the polyol. To prepare a foam, the remaining portion of the polyol is added and the two components are allowed to react in the presence of catalytic systems such as those discussed above and other appropriate additives, such as blowing agents, foam stabilizing agents, fire retardants, etc. The blowing agent (e.g., a halogenated lower aliphatic hydrocarbon), the foam-stabilizing agent, the fire retardant, etc., may be added to either the prepolymer or remaining polyol, or both, prior to the mixing of the component, whereby at the end of the reaction a rigid polyurethane foam is provided.

Urethane elasomers and coatings may be prepared also by known techniques in accordance with the present invention wherein a tertiary amine of this invention is used as a catalyst. See, for example, duPont Bulletin PB-2, by Remington and Lorenz, entitled "The Chemistry of Urethane Coatings".

The invention will be illustrated further with respect to the following specific examples, which are given by way of illustration and not as limitations on the scope of this invention.

EXAMPLE I

Preparation of N,N-dimethylethoxyethylpropionate.

A 500 ml 3-necked flask equipped with a magnetic stirrer, thermometer and distillation column was charged with 150 g of ethyl propionate, 156.5 g of N,N-dimethylaminoethoxyethanol, and 3 g of tetrabutyltitanate. The reaction mass was heated to reflux with overhead being taken at 80° C. 60.3 g of material was distilled and then the reaction was placed under 0.1 mmHg vacuum. The product distilled at 60°-62° C. at 0.1 mmHg vacuum.

EXAMPLE II

Preparation of N,N-dimethylethoxyethylmethacrylate.

A 500 ml 3-necked flask equipped with a magnetic stirrer, thermometer, and distillation head was charged with 125 grams of methylmethacrylate, 133 grams of N,N-dimethylaminoethoxyethanol, 2.5 grams of phenothiazine and 5.6 grams of lead oxide. The reaction was heated to 125° C. for 4 hours during which time ~20 mls of material distilled off. The product distilled at 75° C. and 0.2 mmHg vacuum.

EXAMPLE III

Preparation of N,N-dimethylethoxyethylbenzoate.

A 500 ml 3-necked flask was charged with 136 grams of methyl benzoate, 110.8 grams of N,N-dimethylaminoethoxyethanol and 2.5 grams tetrabutyltitanate. The reaction mass was heated to 130° C. for 2 hours and then distilled. The product distilled at 119°-122° C. and 0.7 mm Hg vacuum.

EXAMPLE IV

The reaction scheme of Example II was followed with the exception that methyl acrylate was employed as the ester reactant.

EXAMPLE V

The reaction scheme of Example I was followed with the exception that ethyl acetate was employed as the ester reactant.

EXAMPLE VI

The reaction scheme of Example I was followed with the exception that N-aminoethoxyethanol morpholine was employed as the alcohol reactant which was transesterified.

EXAMPLE VII

The reaction scheme of Example II was followed with the exceptions that N-aminoethoxyethanol morpholine was employed as the alcohol reactant which was transesterified.

EXAMPLE VIII

The reaction scheme of Example III was followed with the exception that N-aminoethoxyethanol morpholine was employed as the alcohol reactant.

EXAMPLE IX

Typical catalysts of the invention were then utilized in making flexible polyurethane foam based on polyester polyols using the following formulations:

|  | A | B | C | D | E | F |
| --- | --- | --- | --- | --- | --- | --- |
| FOMREZ® 50[1] | 100 | 100 | 100 | 100 | 100 | 100 |
| Silicne L-532[2] | 1.0 | 1.0 | 1.0 | 1.0 | 1.0 | 1.0 |
| ARMEEN® DM-16D[3] | 0.1 | 0.1 | 0.1 | 0.1 | 0.1 | 0.1 |
| WATER | 3.6 | 3.6 | 3.6 | 3.6 | 3.6 | 3.6 |
| Catalyst Example I | 0.75 | — | — | — | — | — |
| Catalyst Example II | — | 0.75 | — | — | — | — |
| Catalyst Example III | — | — | 0.75 | — | — | — |
| THANCAT® NEM[4] | — | — | — | 2.0 | — | — |
| N,N-dimethylamino-ethylmethacrylate | — | — | — | — | 2.0 | — |
| N,N-dimethylamino-ethylpropionate | — | — | — | — | — | 1.0 |
| toluene diisocyanate | 43.5 | 43.5 | 43.5 | 43.5 | 43.5 | 43.5 |
| cream time (seconds) | 14 | 15 | 16 | 13 | 15 | 14 |
| rise time (seconds) | 71 | 80 | 95 | 70 | 65 | 80 |
| tack free after 10 minutes at 120° | Yes | Yes | Yes | Yes | No | No |

[1] A product of Witco Chemical Corp., polyester made from adipic acid and diethylene glycol approximately 2000 molecular weight.
[2] A silicone product of Union Carbide Corp.
[3] A product of Armak Chemical, palmityldimethylamine.
[4] A product of Jefferson Chemical Corp., N-ethyl-morpholine.

It should be noted here that comparison of foams D and E and foams A and F shows the superiority of the catalysts of this invention over seemingly structurally similar catalysts of the general formulation

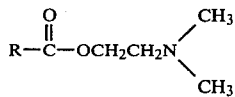

The superiority is shown by the fact that less catalyst is needed to produce a tack free foam after curing for 10 minutes. Thus the foams cure faster while having about the same rise time.

Also, the catalysts of the invention are shown here to be more efficient than N-ethylmorpholine (Examples A, B, C vs. D), a typical commercial tertiary amine catalyst.

EXAMPLE X

The following example shows that a typical catalyst of this invention does not cause pinking of foam as does a typical prior art catalyst. The foams were cured here for 45 minutes at 175° C.

|  | A | B |
| --- | --- | --- |
| FOMREZ® 50 | 100 | 100 |
| Silicone L-532 | 1.0 | 1.0 |
| Water | 3.6 | 3.6 |
| ARMEEN® DM-16D | 0.15 | 0.10 |
| Catalyst Example I | 0.75 | — |
| THANCAT® DM-70[1] | — | 1.0 |
| TDI[2] | 43.5 | 43.5 |
| Pinking of foams | No | Yes |

[1] Product of Jefferson Chemical Co., a mixture of 1,4-dimethylpiperazine and β,β¹-dimorpholinodiethyl ether
[2] Toluene diisocyanate

EXAMPLE XI

This example shows the catalysts here can also be used in making flexible foams based on polyether polyols.

|  | A | B | C |
| --- | --- | --- | --- |
| THANOL® F-3520[1] | 100 | 100 | 100 |
| Silicone L-520[2] | 1.0 | 1.0 | 1.0 |
| Water | 4 | 4 | 4 |
| M&T's T-10[3] | 0.6 | 0.6 | 0.6 |
| Catalyst Example I | 0.17 | — | — |
| Catalyst Example II | — | 0.17 | — |
| Catalyst Example III | — | — | 0.17 |
| toluene diisocyanate | 48.4 | 48.4 | 48.4 |
| cream time (seconds) | 14 | 11 | 12 |
| rise time (seconds) | 85 | 88 | 90 |

[1] A product of Jefferson Chemical Co., a glycerine based polyether polyol of 3500 molecular weight containing 15% ethylene oxide.
[2] A silicone product of Union Carbide Corp.
[3] 50% stannous octoate in dioctylphthalate, M&T Chemicals, Inc.

We claim:

1. A method for producing a polyurethane which comprises reacting an organic polyisocyanate with an organic polyester polyol or polyether polyol in the presence of a catalytic amount of a compound having the following structural formula:

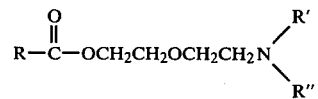

where R is a radical selected from the group consisting of lower alkyl, lower alkenyl and phenyl and R' and R" are either independently lower alkyl or when taken together with the adjacent nitrogen atom form a morpholino radical.

2. The method of claim 1 where R' and R" are methyl and R is ethyl.

3. The method of claim 1 where R' and R" are methyl and R is

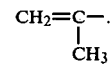

4. The method of claim 1 where R' and R" are methyl and R is phenyl.

5. The method of claim 1 wherein a flexible polyether polyurethane foam is provided which comprises reacting in the presence of a blowing agent said organic polyisocyanate with a polyether polyol formed by the addition of a polyhydric alcohol having a functionality of from 2 to about 4 with an alkylene oxide of 2 to 4 carbon atoms in the presence of said catalyst, said organic polyisocyanate being employed in an amount sufficient to provide 0.4 to 1.5 mol equivalents of isocyanate groups per mol equivalent of hydroxyl groups, said polyether polyol having a molecular weight within the range of about 200-700.

6. The method of claim 1 wherein a flexible polyester polyurethane foam is prepared which comprises reacting in the presence of a blowing agent, toluene diisocyanate with a hydroxyl terminated condensation product of a polycarboxylic acid and a polyhydric alcohol in the presence of said catalyst, said toluene diisocyanate being employed in an amount sufficient to provide 1.0 to 1.5 mol equivalents of isocyanate groups per mol equivalent of hydroxyl groups, said condensation product having a functionality of from about 2 to about 4, and a molecular weight from about 2,000 to about 4,000 and a hydroxyl number ranging from about 25 to about 60.

* * * * *